(12) United States Patent
Berry

(10) Patent No.: US 10,520,193 B2
(45) Date of Patent: Dec. 31, 2019

(54) COOLING PATCH FOR HOT GAS PATH COMPONENTS

(71) Applicant: GENERAL ELECTRIC COMPANY, Schenectady, NY (US)

(72) Inventor: Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 443 days.

(21) Appl. No.: 14/924,742

(22) Filed: Oct. 28, 2015

(65) Prior Publication Data

US 2017/0122562 A1    May 4, 2017

(51) Int. Cl.
| | |
|---|---|
| F23R 3/06 | (2006.01) |
| F23M 5/08 | (2006.01) |
| B23K 31/02 | (2006.01) |
| C21D 9/00 | (2006.01) |
| F02C 7/18 | (2006.01) |
| F23R 3/00 | (2006.01) |
| F01D 9/02 | (2006.01) |
| F01D 25/12 | (2006.01) |
| B23K 101/00 | (2006.01) |
| B23K 103/18 | (2006.01) |

(52) U.S. Cl.
CPC ............... *F23R 3/06* (2013.01); *B23K 31/02* (2013.01); *C21D 9/00* (2013.01); *F01D 9/023* (2013.01); *F01D 25/12* (2013.01); *F02C 7/18* (2013.01); *F23M 5/08* (2013.01); *F23R 3/002* (2013.01); *B23K 2101/001* (2018.08); *B23K 2103/26* (2018.08); *F05D 2230/22* (2013.01); *F23R 2900/03043* (2013.01)

(58) Field of Classification Search
CPC .. F23R 3/002; F23R 3/06; F23R 3/005; F23R 2900/00017; F23R 2900/00018; F23R 2900/00019; F23R 2900/03041–03045; F23M 5/00; F23M 5/08; F23M 5/085; F01D 9/023; F01D 25/12; F02K 1/822; F05D 2230/22; F05D 2230/40–42; B23K 2101/001

See application file for complete search history.

(56) References Cited

U.S. PATENT DOCUMENTS

| | | | |
|---|---|---|---|
| 3,584,972 A * | 6/1971 | Bratkovich | B21D 53/78 29/889.721 |
| 3,750,398 A | 8/1973 | Adelizzi et al. | |
| 4,016,718 A | 4/1977 | Lauck | |
| 4,195,474 A | 4/1980 | Bintz et al. | |
| 4,413,470 A | 11/1983 | Scheihing et al. | |
| 4,422,288 A | 12/1983 | Steber | |
| 4,719,748 A | 1/1988 | Davis, Jr. et al. | |
| 4,819,438 A | 4/1989 | Schultz | |
| 4,903,477 A | 2/1990 | Butt | |

(Continued)

*Primary Examiner* — Gerald L Sung
*Assistant Examiner* — Alain Chau
(74) *Attorney, Agent, or Firm* — Charlotte C. Wilson; James W. Pemrick

(57) ABSTRACT

The present application provides a cooling patch for use with a hot gas path component of a gas turbine engine. The cooling patch may include a base layer with a number of cooling channels extending therethrough, and a cover layer positioned on the base layer. The base layer and the cover layer may include a pre-sintered preform material.

18 Claims, 2 Drawing Sheets

(56) References Cited

U.S. PATENT DOCUMENTS

| | | | |
|---|---|---|---|
| 5,075,966 A * | 12/1991 | Mantkowski | B23P 15/008 29/424 |
| 5,237,813 A | 8/1993 | Harris et al. | |
| 5,761,898 A | 6/1998 | Barnes et al. | |
| 5,822,853 A * | 10/1998 | Ritter | B22F 5/10 29/890.01 |
| 5,826,430 A | 10/1998 | Little | |
| 5,906,093 A | 5/1999 | Coslow et al. | |
| 5,960,632 A | 10/1999 | Abuaf et al. | |
| 6,018,950 A * | 2/2000 | Moeller | F01D 9/023 29/889.2 |
| 6,085,514 A | 7/2000 | Benim et al. | |
| 6,109,019 A | 8/2000 | Sugishita | |
| 6,116,013 A | 9/2000 | Moller | |
| 6,116,018 A | 9/2000 | Tanimura et al. | |
| 6,298,656 B1 | 10/2001 | Donovan et al. | |
| 6,345,494 B1 | 2/2002 | Coslow | |
| 6,397,581 B1 * | 6/2002 | Vidal | F02K 1/822 60/267 |
| 6,412,268 B1 | 7/2002 | Cromer et al. | |
| 6,450,762 B1 | 9/2002 | Munshi | |
| 6,456,627 B1 | 9/2002 | Frodigh et al. | |
| 6,463,742 B2 | 10/2002 | Mandai et al. | |
| 6,523,352 B1 | 2/2003 | Takahashi et al. | |
| 6,568,187 B1 | 5/2003 | Jorgensen et al. | |
| 6,619,915 B1 | 9/2003 | Jorgensen | |
| 6,644,032 B1 | 11/2003 | Jorgensen et al. | |
| 6,921,014 B2 * | 7/2005 | Hasz | C23C 26/02 228/122.1 |
| 7,010,921 B2 | 3/2006 | Intile et al. | |
| 7,310,938 B2 | 12/2007 | Marcum et al. | |
| 7,493,767 B2 * | 2/2009 | Bunker | F23R 3/002 60/752 |
| 7,926,278 B2 * | 4/2011 | Grenendas | F23R 3/002 60/725 |
| 8,015,818 B2 | 9/2011 | Wilson et al. | |
| 8,141,334 B2 * | 3/2012 | Johnson | F23R 3/005 60/39.092 |
| 8,151,570 B2 | 4/2012 | Jennings et al. | |
| 8,499,566 B2 | 8/2013 | Lacy et al. | |
| 8,549,861 B2 | 10/2013 | Huffman | |
| 8,647,053 B2 * | 2/2014 | Hsu | F01D 9/023 415/115 |
| 8,667,682 B2 * | 3/2014 | Lee | B21K 3/00 29/890.01 |
| 9,015,944 B2 * | 4/2015 | Lacy | B23P 15/00 29/890.03 |
| 9,360,217 B2 * | 6/2016 | DiCintio | F23R 3/005 |
| 9,370,846 B2 * | 6/2016 | Morimoto | B23P 15/00 |
| 2002/0112483 A1 | 8/2002 | Kondo et al. | |
| 2003/0140063 A1 | 7/2003 | Shimizu et al. | |
| 2003/0157776 A1 | 9/2003 | Coppola | |
| 2003/1092320 | 10/2003 | Farmer et al. | |
| 2004/0154152 A1 * | 8/2004 | Howard | F23R 3/002 29/428 |
| 2005/0077341 A1 * | 4/2005 | Larrieu | F02K 9/64 228/193 |
| 2006/0053798 A1 * | 3/2006 | Hadder | F23R 3/007 60/772 |
| 2010/0300115 A1 * | 12/2010 | Morimoto | B23P 15/00 60/796 |
| 2011/0252805 A1 | 10/2011 | Berry et al. | |
| 2012/0023949 A1 * | 2/2012 | Johnson | F23R 3/005 60/722 |
| 2012/0034075 A1 * | 2/2012 | Hsu | F01D 9/023 415/178 |
| 2012/0036858 A1 * | 2/2012 | Lacy | F23R 3/002 60/754 |
| 2012/0114868 A1 * | 5/2012 | Bunker | B23P 15/04 427/448 |
| 2012/0121381 A1 * | 5/2012 | Charron | F01D 9/023 415/115 |
| 2012/0121408 A1 * | 5/2012 | Lee | F01D 9/023 415/214.1 |
| 2013/0180691 A1 * | 7/2013 | Jost | B64G 1/50 165/135 |
| 2014/0237784 A1 * | 8/2014 | Lacy | B23P 15/00 29/17.3 |
| 2014/0250894 A1 * | 9/2014 | Petty, Sr. | F23R 3/60 60/754 |
| 2014/0260256 A1 * | 9/2014 | Loebig | F02K 7/02 60/722 |
| 2014/0260257 A1 | 9/2014 | Rullaud et al. | |
| 2014/0260277 A1 * | 9/2014 | DiCintio | F23R 3/005 60/746 |
| 2014/0260282 A1 * | 9/2014 | Pinnick | F23R 3/06 60/754 |
| 2014/0260327 A1 | 9/2014 | Kottilingam et al. | |
| 2015/0041590 A1 | 2/2015 | Kirtley et al. | |
| 2015/0044059 A1 | 2/2015 | Wassynger et al. | |
| 2015/0059357 A1 | 3/2015 | Morgan et al. | |
| 2015/0096305 A1 | 4/2015 | Morgan et al. | |
| 2015/0111060 A1 | 4/2015 | Kottilingam et al. | |
| 2015/0369068 A1 * | 12/2015 | Kottilingam | C22C 19/057 415/116 |
| 2015/0375321 A1 * | 12/2015 | Cui | B22F 7/062 428/408 |

\* cited by examiner

COOLING PATCH FOR HOT GAS PATH COMPONENTS

TECHNICAL FIELD

The present application and the resultant patent relate generally to gas turbine engines and more particularly relate to a cooling patch for enhanced cooling of turbine hot gas path components and the like.

BACKGROUND OF THE INVENTION

In a gas turbine engine, hot combustion gases generally flow from a combustor through a transition piece into a turbine along a hot gas path to produce useful work. Because higher temperature combustion flows generally result in an increase in the performance, the efficiency, and the overall power output of the gas turbine engine, the components that are subject to the higher temperature combustion flows must be cooled to allow the gas turbine engine to operate at such increased temperatures without damage or a reduced lifespan. Similarly, localized overheating or hot spots also may create high thermal stresses therein.

For example, a hot gas path component that should be cooled is the combustor liner. Specifically, the high temperature flows caused by combustion of the fuel/air mixture within the combustor are directed through the combustor liner. The downstream portion of the combustor liner may be connected to other components of the combustor, such as a transition piece and the like, and thus may not be exposed to the various airflows that may cool the remaining components. Such a lack of cooling may cause damage, failure, or the reduced lifespan described above.

There is thus a desire for improved cooling devices and methods for use with hot gas path components and the like. Such improved devices and methods may be applied to localized hot spots and/or elsewhere as needed. Such improved devices and methods may provide cooling without impacting overall system power output and efficiency.

SUMMARY OF THE INVENTION

The present application and the resultant patent thus provide a cooling patch for use with a hot gas path component of a gas turbine engine. The cooling patch may include a base layer with a number of cooling channels extending therethrough, and a cover layer positioned on the base layer. The base layer and the cover layer may include a presintered preform material.

The present application and the resultant patent further provide a method of supplying additional cooling to a hot gas path component. The method may include the steps of aligning a cooling patch with a number of cooling holes on the hot gas path component, attaching the cooling patch to the hot gas path component, heat treating the cooling patch in place, providing a flow of air through the cooling patch to cool the hot gas path component, and flowing the air through the number of cooling holes on the hot gas path component.

The present application and the resultant patent further provide a hot gas path component for use with a gas turbine engine. The hot gas path component may include a number of cooling holes extending therethrough from a cold side surface to a hot side surface and a cooling patch positioned on the cold side surface adjacent to the cooling holes. The cooling patch may include a number of cooling channels such that a flow of air passes through the cooling channels and through the cooling holes to provide cooling.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
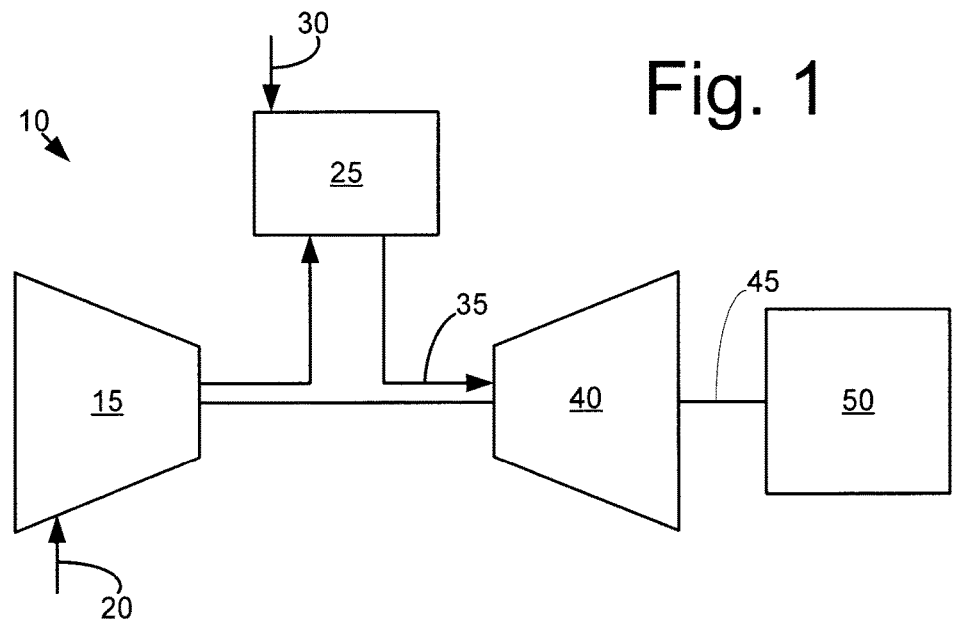
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas liquid fuels, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have many different configurations and may use other types of components. Other types of gas turbine engines also may be used herein. Multiple gas turbine engines, other types of turbines, and other types of power generation equipment also may be used herein together.

Figure 2:
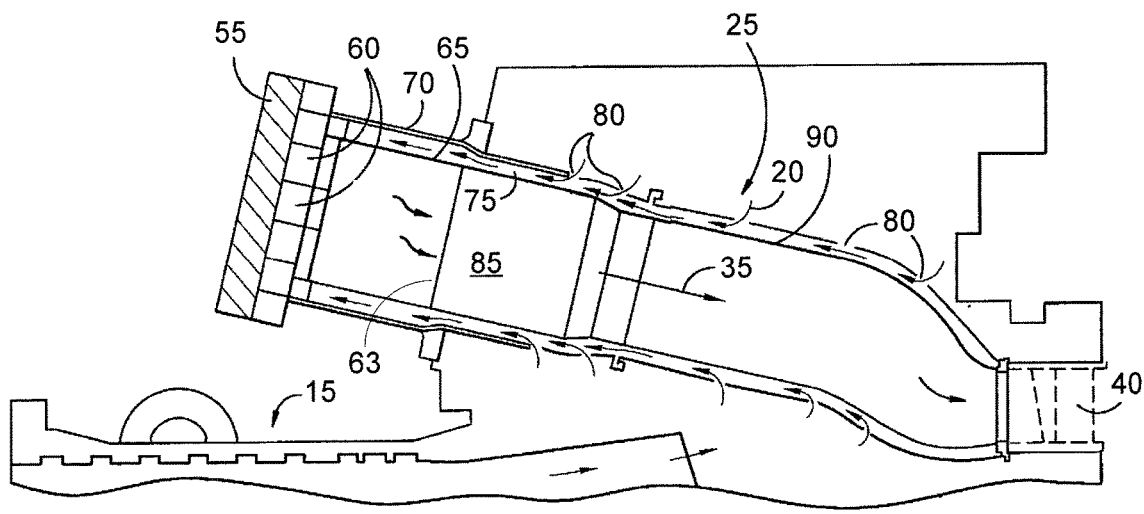
FIG. 2 is a schematic diagram of a combustor that may be used with the gas turbine engine of FIG. 1.

FIG. 2 shows an example of the combustor 25 that may be used with the gas turbine engine 10 and the like. Generally described, the combustor 25 may include a cover plate 55 at an upstream end thereof. The cover plate 55 may at least partially support a number of fuel nozzles 60 therein. Any number or type of the fuel nozzles 60 may be used herein. The cover plate 55 provides a pathway for the flow of air 20 and the flow of fuel 30 to the fuel nozzles 60. The fuel nozzles 60 may extend towards a combustor cap 63.

The combustor 25 may include a combustor liner 65 disposed within a flow sleeve 70. The arrangement of the liner 65 and the flow sleeve 70 may be substantially concentric and may define an annular flow path 75 therebetween. The flow sleeve 70 may include a number of flow sleeve inlets 80 therethrough. The flow sleeve inlets 80 may provide a pathway for at least a portion of the flow air 20 from the compressor 15. The flow sleeve 70 may be perforated with a pattern of the inlets 80 or otherwise. The combustor cap 63 and the combustor liner 65 may define a combustion chamber 85 for the combustion of the flow of air 20 and the flow of fuel 30 downstream of the fuel nozzles 60. The aft end of the combustor 25 may include a transition piece 90. The transition piece 90 may be positioned adjacent to the turbine 40 and may direct the flow of combustion gases 35 thereto. The combustor 25 described herein is for the purpose of example only. Many other types of combustors and combustor components may be known.

Figure 3:
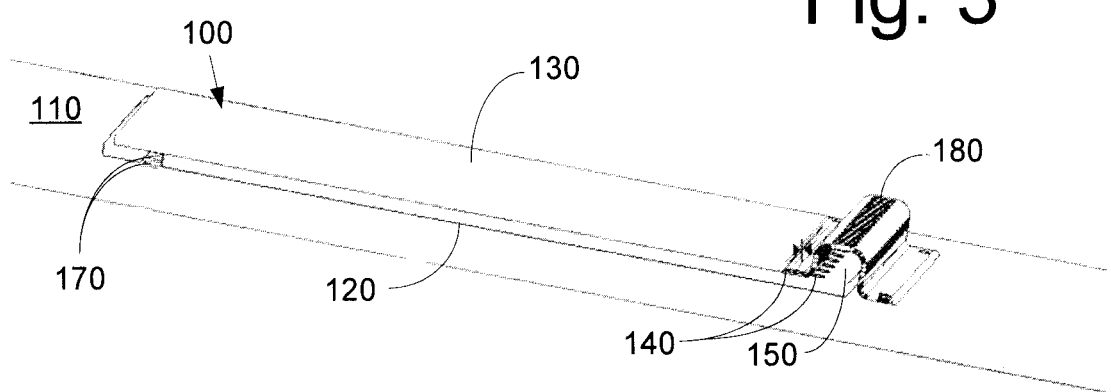
FIG. 3 is a schematic diagram of a cooling patch as may be described herein positioned on a hot gas path component.
Figure 4:
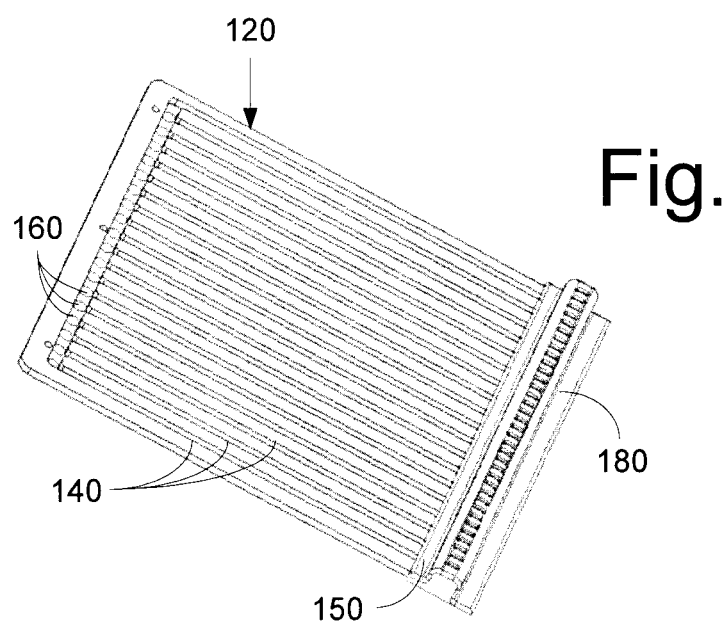
FIG. 4 is a plan view of a base layer of the cooling patch of FIG. 3 positioned on the hot gas path component.

FIGS. 3 and 4 show an example of a cooling patch 100 as may be described herein. The cooling patch 100 may have any suitable size, shape, or configuration. The cooling patch 100 may be used with a hot gas path component 110 and the like. The hot gas path component 110 may be similar to the combustor cap 63, the combustor liner 65, and/or the transition piece 90 as described above and other types of components. Specifically, any type of component 110 requiring or that may benefit from additional cooling may be used herein.

The cooling patch 100 may include a base layer 120 and a cover layer 130. The base layer 120 and the cover layer 130 may have any suitable size, shape, or configuration. The layers 120, 130 may be made from a pre-sintered preform ("PSP") material. The pre-sintered preform material may include a mixture of a high melting point alloy powder, a low melting point alloy powder, and a binding agent. Examples of high melting point alloy powders include but are not limited to structural alloys and environmental coatings such as Inconel 738, Rene 142, MAR-M247, GT-33, and the like. Examples of low melting point alloy powders include but are not limited to braze alloys such as D15, DF4B, BNI-9, BNi-5, B93, and the like. The proportions of the high melting point alloy powder to the low melting point alloy powder may vary. Other types of melting points and proportions may be used herein. Other types and combinations of materials also may be used herein.

The base layer 120 of the cooling patch 100 may have a number of cooling channels 140 formed therein. Any number of the cooling channels 140 may be used herein in any suitable size, shape, or configuration. The cooling channels 140 may extend from an inlet 150 at one end of the base layer 120 to a number of outlet holes 160 passing through the base layer 120 at the other end. The cooling channels 140 may run parallel to the primary flow path along the hot side surface of the hot gas path component 110 or otherwise. In this example, the cooling channels 140 may have a width of about 0.065 inches (about 1.65 millimeters) or so but may range in width from about 0.05 to 0.08 inches (about 1.27 to 2.03 millimeters) or so. The cooling channels 140 may have a length of about one to three inches (about 2.54 to 7.62 centimeters) or so. Other suitable dimensions may be used herein. Any number of the outlet holes 160 may be used herein in any suitable size, shape, or configuration. The outlet holes 160 may align with a number of film holes 170 or other types of apertures positioned about the hot gas path component 110. Other components and other configurations may be used herein.

The cover layer 130 of the cooling patch 100 may be a substantially solid plate. The cover layer 130 may define a top surface of the cooling channels 140 of the base layer 120. The cover layer 130 may extend about from the inlet 150 of the base layer 120 and along the length of the base layer 120 in whole or in part. The cover layer 130 may include a filter 180 positioned about the inlet 150 of the base layer 120. The filter 180 may have any suitable size, shape, or configuration and may be made out of any suitable type of filtering material. Other components and other configurations may be used herein.

In use, the cooling patch 100 may be attached to the cold side surface of the hot gas path component 110 opposite an overheated zone or other area requiring or benefiting from additional cooling. The cooling patch 100 may be tack welded or otherwise attached to the cold side surface of the hot gas path component 110. The outlet holes 160 of the base layer 120 may align with the film holes 170 extending through the hot gas component 110. The cooling patch 100 may be heat treated in place so as to bond the pre-sintered preform material to the hot gas path component 110.

A portion of the flow of air 20 from the compressor 15 or elsewhere may be directed towards the cooling patch 100. The flow of air 20 may be at a conventional compressor discharge temperature as opposed to externally cooled or otherwise conditioned. The flow of air 20 enters into the cooling patch 100 through the filter 180 and into the cooling channels 140. The flow of air 20 through the cooling channels 140 enhances the back side heat transfer so as to improve overall cooling effectiveness. The flow of air 20 then may be directed into the hot gas path via the outlet holes 160 and the film holes 170 to provide film cooling and the like to the hot side surface of the hot gas path component 110.

This airflow through the cooling patch 100 thus provides film cooling and improved heat transfer by reducing the local temperature and the heat transfer coefficient therealong. The use of the filter 180 prevents debris from restricting the flow into the cooling channels 140. The pressure differential between the cold side surface and the hot side surface of the hot gas path component 110 drives the airflow through the cooling channels 140 and into the film holes 170. The limited length of the cooling channels 140 helps to maintain cooling effectiveness and operation with the available pressure drop. The cooling patch 100 described herein thus may be used to extend the useful lifetime of an existing hot gas path component and/or be part of the original equipment. The cooling patch 100 may be added at any time. Moreover, any number of the cooling patches 100 may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A cooling patch configured to provide additional cooling to a hot gas path component of a gas turbine engine, the cooling patch comprising:
   a base layer attached to a cold side surface of the hot gas path component, the base layer having a first surface in contact with the cold side surface and a second surface opposite the first surface;
   a plurality of cooling channels formed in and extending along the second surface of the base layer; and
   a cover layer positioned on the second surface of the base layer, the cover layer comprising a filter at one end thereof;
   wherein the base layer and the cover layer comprise a pre-sintered preform material heat-treated in position on the hot gas path component; and wherein the hot gas path component is a combustor component larger than the cooling patch.

2. The cooling patch of claim 1, wherein the pre-sintered preform material comprises a structural alloy powder having a first melting point, a brazing alloy powder having a second melting point less than the first melting point, and a binding agent.

3. The cooling patch of claim 1, wherein the base layer comprises an inlet adjacent to the plurality of cooling channels.

4. The cooling patch of claim 1, wherein the hot gas path component comprises a plurality of hot gas path component holes therethrough; and wherein the base layer comprises a plurality of outlet holes in fluid communication with the plurality of cooling channels, the plurality of outlet holes being aligned with the plurality of hot gas path component holes.

5. The cooling patch of claim 1, wherein each cooling channel of the plurality of cooling channels comprises a width ranging from 0.05 inches to 0.08 inches and a length ranging from one inch to three inches.

6. The cooling patch of claim 1, wherein the cover layer comprises a substantially solid plate.

7. The cooling patch of claim 1, wherein the cover layer comprises a top surface of the plurality of cooling channels.

8. The cooling patch of claim 1, wherein the cooling patch is in communication with a flow of air at a compressor discharge temperature.

9. A method of providing additional cooling to a hot gas path component, the method comprising:
aligning a cooling patch with a number of cooling holes on the hot gas path component, the cooling patch comprising a base layer having a first surface and a second surface, a plurality of cooling channels formed in and extending along the second surface of the base layer, a cover layer defining a top surface of the plurality of cooling channels, and a plurality of outlet holes in fluid communication with the plurality of cooling channels, the aligning of the cooling patch including aligning the plurality of outlet holes with the number of cooling holes;
attaching the first surface of the base layer of the cooling patch to a cold side surface of the hot gas path component, wherein the hot gas path component is a combustor component larger than the cooling patch;
heat treating the cooling patch in place;
providing a flow of air through a filter attached at one end of the cover layer proximate to the plurality of cooling channels of the cooling patch, such that the flow of air flows through the plurality of cooling channels to cool the hot gas path component; and
flowing the air through the number of cooling holes on the hot gas path component.

10. The method of claim 9, wherein the step of attaching the cooling patch to the hot gas path component comprises welding the cooling patch to the hot gas path component.

11. The method of claim 9, wherein the step of attaching the cooling patch to the hot gas path component comprises attaching the cooling patch in an orientation in which the plurality of cooling channels is disposed in a substantially parallel direction to a flow of gases within the hot gas path component.

12. The method of claim 9, wherein the step of heat treating the cooling patch in place comprises heat treating a pre-sintered preform material.

13. The method of claim 9, wherein the step of providing a flow of air through the cooling patch to cool the hot gas path component comprises providing a flow of air at a compressor discharge temperature.

14. The method of claim 9, wherein the step of flowing the air through the number of cooling holes on the hot gas path component comprises flowing the air through the number of cooling holes to provide film cooling of a hot side surface of the hot gas path component.

15. A hot gas path component for use with a gas turbine engine, the hot gas path component comprising:
a combustor liner having a cold side surface and a hot side surface;
a plurality of cooling holes extending through the combustor liner from the cold side surface to the hot side surface; and
a cooling patch having a first surface positioned on and attached to the cold side surface of the combustor liner adjacent to the plurality of cooling holes, a second surface opposite the first surface, and a filter attached at one end of the cooling patch;
wherein the second surface of the cooling patch comprises a plurality of cooling channels such that a flow of air passes through the plurality of cooling channels and through the plurality of cooling holes; and wherein the cooling patch is smaller than the combustor liner.

16. The hot gas path component of claim 15, wherein the cooling patch comprises a pre-sintered preform material.

17. The hot gas path component of claim 16, wherein the pre-sintered preform material comprises a structural alloy powder having a first melting point, a brazing alloy powder having a second melting point less than the first melting point, and a binding agent.

18. The hot gas path component of claim 15, wherein the cooling patch comprises a base layer having the second surface in which the plurality of cooling channels is formed and a cover layer positioned on the second surface of the base layer.

* * * * *